(12) United States Patent
Tsukiyama et al.

(10) Patent No.: US 10,570,810 B2
(45) Date of Patent: Feb. 25, 2020

(54) FORCED-INDUCTION DEVICE FOR VEHICLE

(71) Applicants: TOYOTA JIDOSHA KABUSHIKI KAISHA, Toyota-shi, Aichi-ken (JP); AISIN TAKAOKA CO., LTD., Toyota-shi, Aichi-ken (JP)

(72) Inventors: Takashi Tsukiyama, Toyota (JP); Haruto Ura, Nagakute (JP); Tsuyoshi Uesugi, Takahama (JP); Daisuke Terui, Obu (JP); Akihiro Hosono, Toyota (JP); Ryuta Kawazoe, Chiryu (JP)

(73) Assignees: TOYOTA JIDOSHA KABUSHIKI KAISHA, Toyota (JP); AISIN TAKAOKA CO., LTD., Toyota (JP)

( * ) Notice: Subject to any disclaimer, the term of this patent is extended or adjusted under 35 U.S.C. 154(b) by 256 days.

(21) Appl. No.: 15/716,316

(22) Filed: Sep. 26, 2017

(65) Prior Publication Data

US 2018/0100427 A1 Apr. 12, 2018

(30) Foreign Application Priority Data

Oct. 6, 2016 (JP) .................................. 2016-198145

(51) Int. Cl.
*F02B 37/00* (2006.01)
*F01D 25/24* (2006.01)
*F16L 23/08* (2006.01)

(52) U.S. Cl.
CPC .......... *F02B 37/004* (2013.01); *F01D 25/243* (2013.01); *F16L 23/08* (2013.01);
(Continued)

(58) Field of Classification Search
CPC .... F02B 37/004; F02B 37/013; F01D 25/243; F16L 23/08; F05D 2220/40; F05D 2260/39; Y02T 10/144
(Continued)

(56) References Cited

U.S. PATENT DOCUMENTS 1,483,499 A * 2/1924 Allee ...................... F16L 23/20
                                                              285/340
1,509,562 A * 9/1924 MacGregor ......... F16L 27/0812
                                                              285/280

(Continued)

FOREIGN PATENT DOCUMENTS

EP    2 400 126 A1    12/2011
JP    2005-344580 A   12/2005
(Continued)

*Primary Examiner* — Thai Ba Trieu
(74) *Attorney, Agent, or Firm* — Oliff PLC

(57) ABSTRACT

A vehicle forced-induction device includes a first exhaust turbine type forced-induction unit and a second exhaust turbine type forced-induction unit. The first forced-induction unit includes an outlet pipe. The outlet pipe includes a first tubular portion and an annular first flange. The second forced-induction unit includes an inlet pipe. The inlet pipe includes a second tubular portion and an annular second flange. The forced-induction device includes a fastener that includes an annular groove. The annular groove has a shape in which a width of the annular groove decreases toward a groove bottom. The fastener is wound around the first and second flanges along a circumference of the first and the second flanges, thereby housing the first and second flanges in the annular groove. The fastener fastens the first and second flanges to urge the first and second flanges toward each other.

13 Claims, 3 Drawing Sheets

(52) U.S. Cl.
CPC ...... *F05D 2220/40* (2013.01); *F05D 2260/39* (2013.01); *Y02T 10/144* (2013.01)

(58) Field of Classification Search
USPC ............... 60/612; 123/562; 285/13–14, 408, 285/340–341; 277/614
See application file for complete search history.

(56) References Cited

U.S. PATENT DOCUMENTS

| | | | | |
|---|---|---|---|---|
| 1,782,484 A * | 11/1930 | Spencer | F16L 21/022 | 285/146.3 |
| 1,821,863 A * | 9/1931 | Wilson | F16L 17/08 | 285/363 |
| 1,821,866 A * | 9/1931 | Wilson | F16L 23/20 | 285/363 |
| 1,825,062 A * | 9/1931 | Heaton | F16L 13/06 | 285/14 |
| 1,855,494 A * | 4/1932 | Sorensen | F16L 23/20 | 285/340 |
| 1,906,826 A * | 5/1933 | Smith | F16L 19/0218 | 285/328 |
| 1,952,531 A * | 3/1934 | Campbell | F16L 33/224 | 285/148.19 |
| 2,016,262 A * | 10/1935 | Arey | F16L 27/0804 | 15/104.05 |
| 2,675,253 A * | 4/1954 | Stade | F16L 23/10 | 285/408 |
| 2,735,700 A * | 2/1956 | Bowan et al. | F16L 19/061 | 285/232 |
| 3,156,475 A * | 11/1964 | Gerard | F16J 15/166 | 277/441 |
| 3,325,176 A * | 6/1967 | Latham | F16L 23/08 | 285/334.2 |
| 3,339,950 A * | 9/1967 | Grove | F16L 23/026 | 285/363 |
| 3,348,850 A * | 10/1967 | Scales | F16L 5/08 | 285/230 |
| 3,429,581 A * | 2/1969 | Himmel | F16J 15/04 | 285/334.4 |
| 3,441,293 A * | 4/1969 | Bagnulo | F16L 25/03 | 285/295.2 |
| 3,576,102 A * | 4/1971 | West | F02B 37/013 | 60/602 |
| 3,782,419 A * | 1/1974 | Hanson | F16L 25/023 | 138/109 |
| 4,563,025 A * | 1/1986 | Poe | F16L 23/08 | 277/614 |
| 4,787,654 A * | 11/1988 | Zeitlin | F16L 23/036 | 285/101 |
| 5,470,114 A * | 11/1995 | Umney | F16L 23/08 | 285/347 |
| 5,692,378 A * | 12/1997 | Ramsden | F02B 37/013 | 60/612 |
| 5,851,033 A * | 12/1998 | Hunt | F16L 58/187 | 285/13 |
| 8,453,447 B2 * | 6/2013 | Barth | F02B 37/004 | 60/612 |
| 8,667,794 B2 * | 3/2014 | Perrin | F02B 37/183 | 123/562 |
| 8,720,421 B2 * | 5/2014 | Niwa | F02B 37/013 | 123/562 |
| 9,217,394 B2 * | 12/2015 | Kurata | F02B 37/004 | |
| 2007/0169479 A1 * | 7/2007 | Nicolle | F02B 37/18 | 60/612 |
| 2012/0000196 A1 * | 1/2012 | Niwa | F02B 37/013 | 60/602 |
| 2012/0189433 A1 * | 7/2012 | Baker | F01D 17/167 | 415/158 |
| 2013/0269341 A1 | 10/2013 | Kurata et al. | | |
| 2014/0097611 A1 * | 4/2014 | Webb | F16L 23/003 | 285/13 |
| 2014/0353538 A1 * | 12/2014 | Jeanson | F02B 37/004 | 251/364 |
| 2016/0341057 A1 * | 11/2016 | Akiyama | F01D 25/243 | |
| 2018/0023464 A1 * | 1/2018 | An | F02B 37/186 | 60/612 |
| 2018/0038290 A1 * | 2/2018 | An | F02B 37/013 | |
| 2018/0328226 A1 * | 11/2018 | Yokoshima | F01D 25/243 | |
| 2019/0085757 A1 * | 3/2019 | Uchibori | F02B 37/18 | |

FOREIGN PATENT DOCUMENTS

| | | |
|---|---|---|
| JP | 2012-012990 A | 1/2012 |
| JP | 5115648 B2 | 1/2013 |
| WO | 2012/090662 A1 | 7/2012 |

* cited by examiner

FORCED-INDUCTION DEVICE FOR VEHICLE

BACKGROUND OF THE INVENTION

The present invention relates to a vehicle forced-induction device in which two forced-induction units are arranged in series.

Japanese Laid-Open Patent Publication No. 2012-012990 discloses a vehicle forced-induction device that includes a first forced-induction unit and a second forced-induction unit, which are arranged in series. In the forced-induction device, the first forced-induction unit includes a first turbine housing for housing a turbine, and the second forced-induction unit includes a second turbine housing for housing a turbine. The first turbine housing and the second turbine housing each include an inlet pipe for introducing exhaust gas and an outlet pipe for discharging exhaust gas to the outside. The distal end of the outlet pipe of the first turbine housing and the distal end of the inlet pipe of the second turbine housing each have a flange. Then, these flanges are fastened together with bolts in a state in which the end face of the distal end of the outlet pipe of the first turbine housing and the end face of the distal end of the inlet pipe of the second turbine housing, so that the outlet pipe of the first turbine housing and the inlet pipe of the second turbine housing are connected to each other. In the forced-induction device disclosed in the above publication, the flanges are fastened together with an intermediate member, which has a valve, placed in between. By arranging the two forced-induction units in series in this way, the exhaust gas discharged from the first turbine housing is introduced into the second turbine housing.

In the above structure, in which two flanges face each other and are fastened together with bolts, each flange needs to have bolt insertion holes. The existence of the bolt insertion holes inevitably increases the dimension of each flange in the radial direction from the central axis of the outlet pipe and the inlet pipe.

SUMMARY OF THE INVENTION

To achieve the foregoing objective and in accordance with one aspect of the present invention, a vehicle forced-induction device is provided that includes a first exhaust turbine type forced-induction unit and a second exhaust turbine type forced-induction unit. The first forced-induction unit includes an outlet pipe that discharges exhaust gas from inside the first forced-induction unit. The outlet pipe includes a first tubular portion, through which exhaust gas passes, and an annular first flange provided at a distal end of the first tubular portion. The second forced-induction unit includes an inlet pipe that introduces exhaust gas into the second forced-induction unit. The inlet pipe includes a second tubular portion, through which exhaust gas passes, and an annular second flange provided at a distal end of the second tubular portion. The first flange of the outlet pipe and the second flange of the inlet pipe are connected to each other so that the first tubular portion and the second tubular portion communicate with each other. The vehicle forced-induction device further includes a fastener that fastens the first flange and the second flange to each other. The fastener includes an annular groove. The annular groove has a shape in which a width of the annular groove decreases toward a groove bottom. The fastener is wound around the first and second flanges along a circumference of the first and the second flanges, thereby housing the first and second flanges in the annular groove. The fastener fastens the first and second flanges to urge the first and second flanges toward each other.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DETAILED DESCRIPTION OF THE PREFERRED EMBODIMENTS

A vehicle forced-induction device 10 according to one embodiment will now be described with reference to FIGS. 1 to 4.

Figure 1:
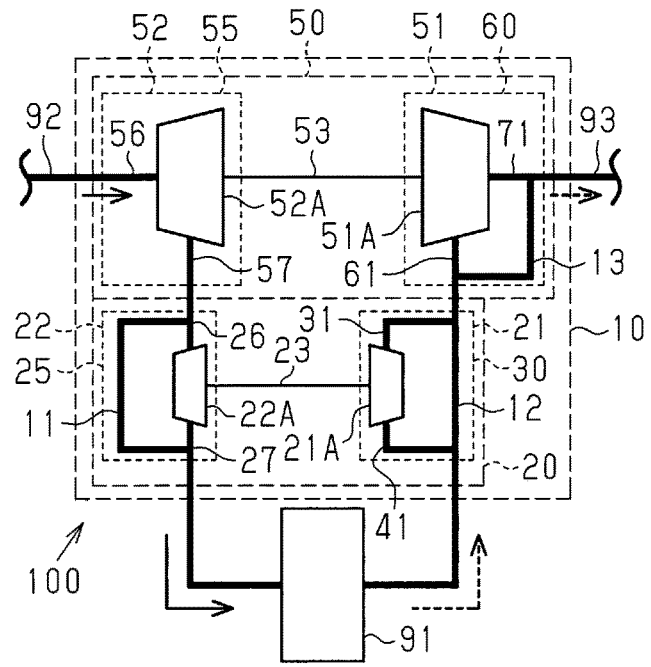
FIG. 1 is a diagram showing an internal combustion engine equipped with a vehicle forced-induction device according to one embodiment.

FIG. 1 shows an on-vehicle internal combustion engine 100 equipped with the forced-induction device 10 of the present embodiment. As shown in FIG. 1, the internal combustion engine 100 includes a combustion chamber 91, in which air-fuel mixture containing intake air and fuel is burned, an intake passage 92, which introduces intake air flowing in the direction indicated by the arrows of solid lines in FIG. 1 into the combustion chamber 91, and an exhaust passage 93, through which exhaust gas discharged from the combustion chamber 91 flows in the direction indicated by the arrows of the broken lines in FIG. 1.

The forced-induction device 10 includes a high-pressure-side forced-induction unit 20, which is a first forced-induction unit, and a low-pressure-side forced-induction unit 50, which is a second forced-induction unit. The forced-induction units 20, 50 are of exhaust turbine type.

As shown in FIG. 1, the high-pressure-side forced-induction unit 20 includes a turbine 21 arranged in the exhaust passage 93 and a compressor 22 arranged in the intake passage 92. The turbine 21 includes a turbine wheel 21A, which rotates by receiving exhaust gas, and a turbine housing 30, which houses the turbine wheel 21A. The compressor 22 includes a compressor wheel 22A and a compressor housing 25, which houses the compressor wheel 22A. The compressor wheel 22A is coupled to the turbine wheel 21A via a turbine shaft 23 and rotates in synchronization with the turbine wheel 21A.

The turbine housing 30 includes an inlet pipe 41, which constitutes an introduction passage for exhaust gas to the turbine 21, and an outlet pipe 31, which constitutes a discharge passage for exhaust gas that has passed through the turbine 21. In addition, the compressor housing 25 includes an inlet pipe 26, which constitutes an introduction passage for intake air to the compressor 22, and an outlet pipe 27, which constitutes a discharge passage for intake air that has been forcedly introduced by the compressor 22.

Figure 2:
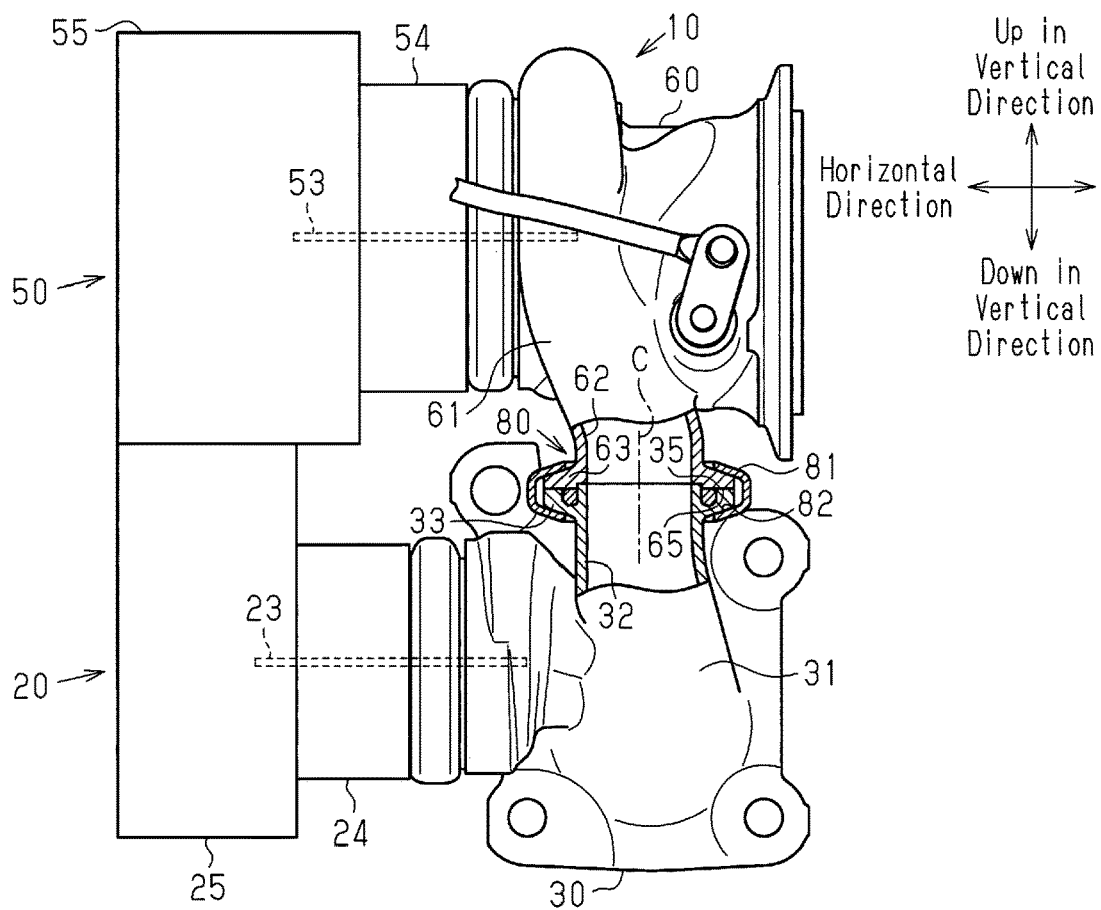
FIG. 2 is a diagram, with a part cut away, showing a schematic structure of the vehicle forced-induction device according to the embodiment.

As shown in FIG. 2, the high-pressure-side forced-induction unit 20 has a bearing housing 24, which is arranged between the turbine housing 30 and the compressor housing 25 and through which the turbine shaft 23 is inserted. The bearing housing 24 rotationally supports the turbine shaft 23. The bearing housing 24 is connected to the turbine housing 30 and connected to the compressor housing 25.

As shown in FIG. 1, the low-pressure-side forced-induction unit 50 includes a turbine 51 arranged in the exhaust passage 93 and a compressor 52 arranged in the intake passage 92. The turbine 51 includes a turbine wheel 51A, which rotates by receiving exhaust gas, and a turbine housing 60, which houses the turbine wheel 51A. The compressor 52 includes a compressor wheel 52A and a compressor housing 55, which houses the compressor wheel 52A. The compressor wheel 52A is coupled to the turbine wheel 51A via a turbine shaft 53 and rotates in synchronization with the turbine wheel 51A.

The turbine housing 60 includes an inlet pipe 61, which constitutes an introduction passage for exhaust gas to the turbine 51, and an outlet pipe 71, which constitutes a discharge passage for exhaust gas that has passed through the turbine 51. In addition, the compressor housing 55 includes an inlet pipe 56, which constitutes an introduction passage for intake air to the compressor 52, and an outlet pipe 57, which constitutes a discharge passage for intake air that has been forcedly introduced by the compressor 52.

As shown in FIG. 2, the low-pressure-side forced-induction unit 50 has a bearing housing 54, which is arranged between the turbine housing 60 and the compressor housing 55 and through which the turbine shaft 53 is inserted. The bearing housing 54 rotationally supports the turbine shaft 53. The bearing housing 54 is connected to the turbine housing 60 and connected to the compressor housing 55.

In the forced-induction device 10 of the present embodiment, the two forced-induction units 20, 50 are arranged in series. Specifically, as shown in FIG. 1, the compressor 52 of the low-pressure-side forced-induction unit 50 is arranged on the intake upstream side of the compressor 22 of the high-pressure-side forced-induction unit 20. The outlet pipe 57 of the compressor 52 and the inlet pipe 26 of the compressor 22 are connected to each other such that the discharge passage inside the outlet pipe 57 and the introduction passage inside the inlet pipe 26 communicate with each other.

Thus, the intake air flowing through the intake passage 92 is introduced into the compressor 52 via the inlet pipe 56 and discharged from the compressor 52 via the outlet pipe 57. The intake air discharged from the compressor 52 is introduced into the compressor 22 via the inlet pipe 26 and discharged from the compressor 22 via the outlet pipe 27. Then, the intake air discharged from the compressor 22, that is, the intake air discharged from the forced-induction device 10 is introduced into the combustion chamber 91.

The turbine 21 of the high-pressure-side forced-induction unit 20 is arranged on the exhaust upstream side of the turbine 51 of the low-pressure-side forced-induction unit 50. The outlet pipe 31 of the turbine 21 and the inlet pipe 61 of the turbine 51 are connected to each other such that the discharge passage inside the outlet pipe 31 and the introduction passage inside the inlet pipe 61 communicate with each other.

Thus, the exhaust gas discharged from the combustion chamber 91 to the exhaust passage 93 is introduced into the turbine 21 via the inlet pipe 41 and is discharged from the turbine 21 via the outlet pipe 31. The exhaust gas discharged from the turbine 21 is introduced into the turbine 51 via the inlet pipe 61 and discharged from the turbine 51 via the outlet pipe 71.

The high-pressure-side forced-induction unit 20 has a bypass passage 11, which bypasses the compressor wheel 22A in the compressor 22. The bypass passage 11 includes a valve (not shown) that adjusts the flow rate of intake air passing through the bypass passage 11. The high-pressure-side forced-induction unit 20 has a bypass passage 12, which bypasses the turbine wheel 21A in the turbine 21. The low-pressure-side forced-induction unit 50 has a bypass passage 13, which bypasses the turbine wheel 51A in the turbine 51. The bypass passages 12, 13 each include a valve (not shown) that adjusts the flow rate of exhaust gas passing through the bypass passages 12, 13.

FIG. 2 shows arrows indicating the vertical direction and the horizontal direction in a state in which the forced-induction device 10 is mounted on the internal combustion engine 100 are shown. In the following description, the state in which the forced-induction device 10 is mounted on the vehicle in this manner will be referred to as an on-vehicle state.

In the on-vehicle state, the high-pressure-side forced-induction unit 20 and the low-pressure-side forced-induction unit 50 are arranged on top of each other in the vertical direction. In the present embodiment, the high-pressure-side forced-induction unit 20 is located on the lower side in the vertical direction of the low-pressure-side forced-induction unit 50 in the on-vehicle state. In the on-vehicle state, the turbine shaft 23 of the high-pressure-side forced-induction unit 20 is parallel to a horizontal plane, and the turbine shaft 53 of the low-pressure-side forced-induction unit 50 is parallel to a horizontal plane. The capacity of the low-pressure-side forced-induction unit 50 is larger than that of the high-pressure-side forced-induction unit 20, and the mass of the low-pressure-side forced-induction unit 50 is larger than that of the high-pressure-side forced-induction unit 20. Thus, the high-pressure-side forced-induction unit 20 bears the weight of the low-pressure-side forced-induction unit 50, the mass of which is larger than that of the high-pressure-side forced-induction unit, at part that contacts the low-pressure-side forced-induction unit 50.

Figure 3:
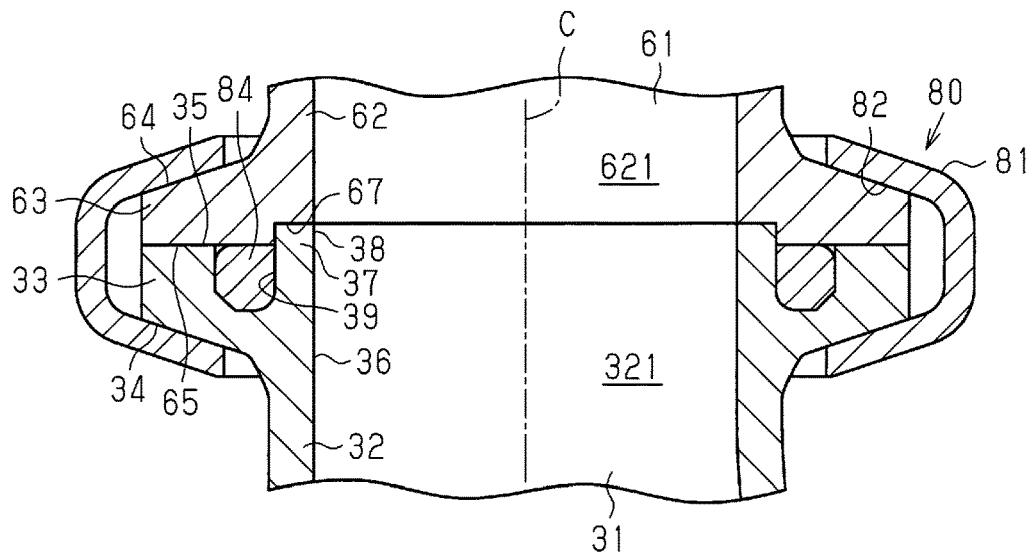
FIG. 3 is a cross-sectional view showing the part in which the turbine housings are connected to each other in the vehicle forced-induction device according to the embodiment.

With reference to FIGS. 2 and 3, the configuration of the outlet pipe 31 of the turbine 21 and the inlet pipe 61 of the turbine 51 and the manner in which the outlet pipe 31 and the inlet pipe 61 are connected together will now be described.

The outlet pipe 31 has a first tubular portion 32. The first tubular portion 32 has therein a discharge passage 321 as an exhaust gas transferring passage through which the exhaust gas discharged from the turbine 21 flows. The inlet pipe 61 has a second tubular portion 62. The second tubular portion 62 has therein an introduction passage 621 as an exhaust gas transferring passage through which the exhaust gas discharged from the turbine 51 flows. The inner diameter of the first tubular portion 32 and the inner diameter of the second tubular portion 62 are equal to each other. The outlet pipe 31 and the inlet pipe 61 are connected each other such that a distal end face 35 (the upper end face in the drawing) of the outlet pipe 31 and the distal end face 65 (the lower end face in the drawing) of the inlet pipe 61 abut against each other, and that the central axis of the first tubular portion 32 and the central axis of the second tubular portion 62 are aligned with each other. In FIGS. 2 and 3, the central axis of the first tubular portion 32 and the central axis of the second tubular portion 62 are represented by an axis C.

The outlet pipe 31 has an annular first flange 33 provided at the distal end of the first tubular portion 32. The outlet pipe 31 is arranged such that the distal end face 35 is horizontal in the on-vehicle state. The face of the first flange 33 on the side opposite to the distal end face 35 in the extending direction of the axis C is an inclined surface 34, which approaches the distal end face 35 as the distance from the axis C increases in the radial direction. That is, when the dimension of the first flange 33 in the extending direction of the axis C is defined as the thickness of the first flange 33, the thickness of the first flange 33 gradually decreases toward the radially outer end.

The inlet pipe 61 has an annular second flange 63 provided at the distal end of the second tubular portion 62. The first flange 33 and the second flange 63 are aligned in the extending direction of the axis C. The distal end face 35 of the outlet pipe 31 and the distal end face 65 of the inlet pipe 61 are opposed to each other. The inlet pipe 61 is arranged such that the distal end face 65 is horizontal in the on-vehicle state. The face of the second flange 63 on the side opposite to the distal end face 65 in the extending direction of the axis C is an inclined surface 64, which approaches the distal end face 65 as the distance from the axis C increases in the radial direction. That is, when the dimension of the second flange 63 in the extending direction of the axis C is defined as the thickness of the second flange 63, the thickness of the second flange 63 gradually decreases toward the radially outer end.

Both of the distal end face 35 of the outlet pipe 31 and the distal end face 65 of the inlet pipe 61 are annular. The outer diameter of the distal end face 35 of the outlet pipe 31 is equal to the outer diameter of the distal end face 65 of the inlet pipe 61.

The inlet pipe 61 has a recess 67 in the distal end face 65. More specifically, the recess 67 is provided in the second tubular portion 62 of the inlet pipe 61. The recess 67 is annular so as to surround the introduction passage 621 inside the second tubular portion 62 and communicates with the introduction passage 621. Further, the recess 67 is provided such that the bottom surface thereof is horizontal in the on-vehicle state.

The outlet pipe 31 includes a protrusion 37 protruding from the distal end face 35 toward the inlet pipe 61 (toward the upper side as viewed in the drawings). More specifically, the protrusion 37 is provided in the first tubular portion 32 of the outlet pipe 31. The protrusion 37 has a shape complementary to the recess 67 of the inlet pipe 61 and has a tubular shape surrounding the discharge passage 321 inside the first tubular portion 32. The inner diameter of the protrusion 37 is equal to the inner diameter of the first tubular portion 32 and an inner circumferential surface 38 of the protrusion 37 is continuous with an inner circumferential surface 36 of the first tubular portion 32. That is, the inner circumferential surface 38 of the protrusion 37 constitutes part of the wall surface in the discharge passage 321. Further, the protrusion 37 is provided such that the top surface thereof is horizontal in the on-vehicle state.

Further, the outlet pipe 31 has an annular housing groove 39, which opens in the distal end face 35, on the radially outer side of the protrusion 37. The housing groove 39 houses an annular sealing member 84.

In a state in which the outlet pipe 31 and the inlet pipe 61 are connected to each other, the protrusion 37 is fitted into the recess 67, and the distal end face 35 is in surface contact with the distal end face 65. Further, the sealing member 84 is in close contact with the distal end face 65 of the inlet pipe 61.

The first flange 33 of the outlet pipe 31 and the second flange 63 of the inlet pipe 61 are fastened together by a fastener 80. The fastener 80 has a V-band 81 wound around the first and second flanges 33, 63 in the circumferential direction of the first flange 33 and the second flange 63. The V-band 81 is arranged such that its center is located on the axis C. The V-band 81 has an annular groove 82 extending over the entire inner circumference. The annular groove 82 has a shape in which the dimension in the extending direction of the axis C becomes smaller toward the outer end in the radial direction from the axis C, that is, the width decreases the groove bottom.

The annular groove 82 houses the first flange 33 and the second flange 63. The V-band 81 is in contact with the inclined surface 34 of the first flange 33 and the inclined surface 64 of the second flange 63. That is, the V-band 81 holds the first flange 33 and the second flange 63 arranged in the extending direction of the axis C.

Further, the fastener 80 has an adjuster bolt capable of adjusting the inner diameter of the V-band 81. By tightening the adjusting bolt, the inner diameter of the V-band 81 is reduced. As the inner diameter of the V-band 81 decreases, the V-band 81 comes to hold thicker portions of the flanges 33, 63. This increases the amount of elastic deformation of the V-band 81, so that the urging force applied by the V-band 81, or the force fastening the flanges 33, 63, is increased. In other words, the force urging the flanges 33, 63 toward each other becomes greater. The flanges 33, 63 are fastened together by the fastening force applied to the flanges 33, 63 by the fastener 80 as described above, so that the outlet pipe 31 and the inlet pipe 61 are connected to each other.

Figure 4:
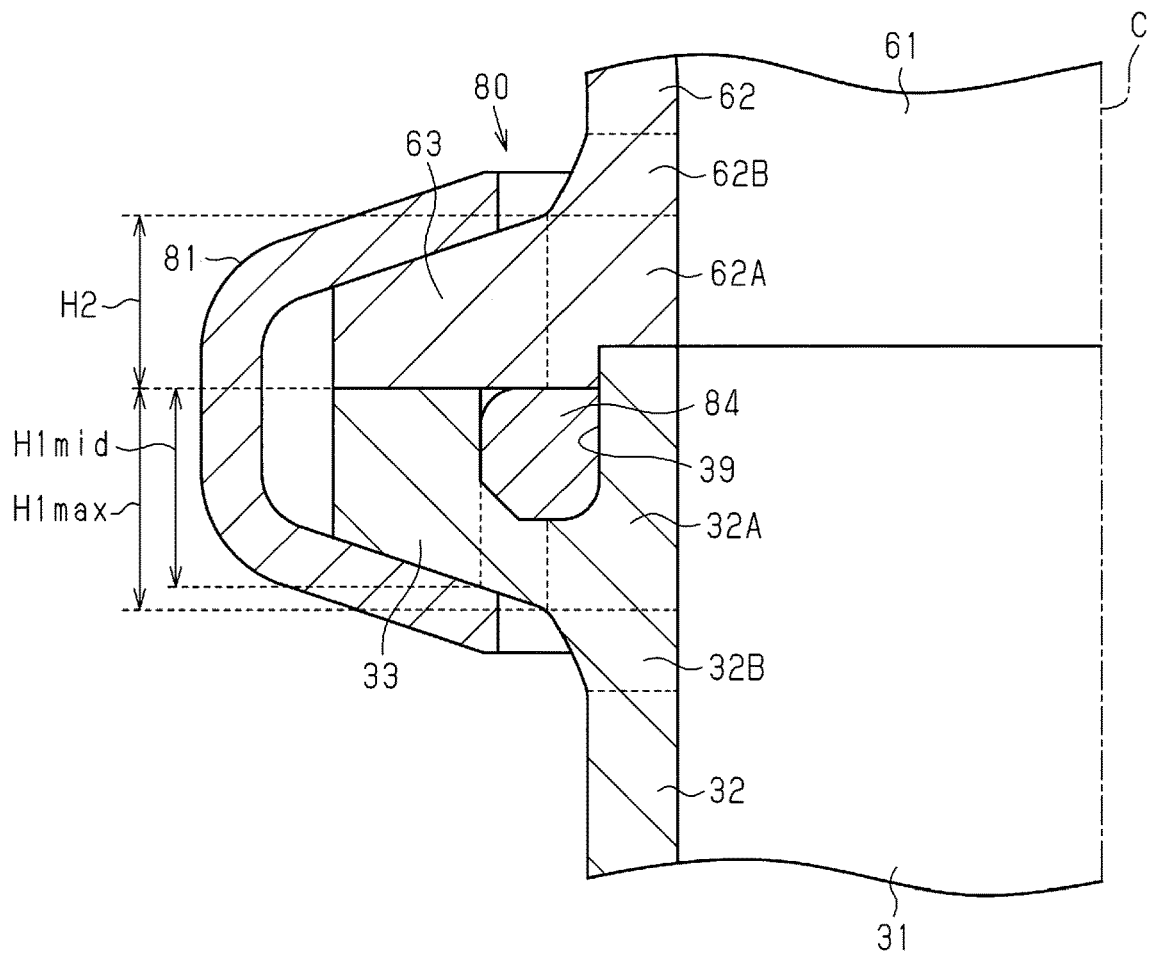
FIG. 4 is a partially enlarged cross-sectional view showing the part in which the turbine housings are connected to each other in the vehicle forced-induction device according to the embodiment.

With reference to FIG. 4, the boundary between the first flange 33 and the first tubular portion 32 in the outlet pipe 31 and the boundary between the second flange 63 and the second tubular portion 62 in the inlet pipe 61 will be described.

A portion of the first tubular portion 32 of the outlet pipe 31 to which the first flange 33 is connected will be referred to as a distal end portion 32A of the first tubular portion 32. In this case, the first tubular portion 32 has a thick portion 32B on the proximal side of the distal end portion 32A. The dimension of the thick portion 32B in the radial direction from the axis C increases toward the distal end portion 32A. Also, a portion of the second tubular portion 62 of the inlet pipe 61 to which the second flange 63 is connected will be referred to as a distal end portion 62A of the second tubular portion 62. As in the case of the first tubular portion 32, the second tubular portion 62 has a thick portion 62B on the proximal side of the distal end portion 62A. The dimension of the thick portion 62B in the radial direction from the axis C increases toward the distal end portion 62A.

The dimension of the first flange 33 in the extending direction of the axis C, that is, the thickness of the first flange 33 is largest at the radially inner end. Similarly, the thickness of the second flange 63 is largest at the radially inner end. As shown in FIG. 4, the dimension H1max, which is the thickness at the radially inner end of the first flange 33 is larger than the dimension H2, which is the thickness at the radially inner end of the second flange 63.

A circumferential wall on the radially outer side of the housing groove 39 is provided in the first flange 33 and a circumferential wall on the radially inner side of the housing groove 39 is provided in the first tubular portion 32. The dimension H1mid, which is the thickness of the first flange 33 at the portion on the circumferential wall of the housing groove 39 on the radially outer side is provided is smaller than the dimension H2, which is the thickness at the radially inner end of the second flange 63. Therefore, at the arrangement position of the housing groove 39 in the radial direction of each flange 33, 63, both the dimension H1max and the dimension H1mid of the first flange 33, which has the housing groove 39, are larger than the dimension H2 of the second flange 63.

Next, the operation of the forced-induction device 10 according to the present embodiment and its advantages will be described.

As shown in FIGS. 2 and 3, in the forced-induction device 10, the V-band 81 is wound around the first and second flanges 33, 63 to apply, to the first flange 33 and the second flange 63, a force that urges each of the flanges 33, 63 to the other flange. As a result, the first flange 33 and the second flange 63 are fastened together by the fastener 80, and the outlet pipe 31 of the high-pressure-side forced-induction unit 20 and the inlet pipe 61 of the low-pressure-side forced-induction unit 50 are connected to each other.

In the case where the first flange 33 and the second flange 63 are fastened together by the fastener 80 as described above, the flanges 33, 63 do not need to have bolt insertion holes, unlike the case where the flanges are fastened together by bolts. Accordingly, the sizes of the flanges 33, 63 are not enlarged in the radial direction from the axis C.

Further, when flanges are fastened to each other with bolts, the fastening force for bringing the respective flanges close to each other easily varies in the circumferential direction of the flanges. In contrast, in the present embodiment, the V-band 81 is wound around the flanges 33, 63 and contacts a wide range of the inclined surfaces 34, 64. Therefore, the fastening force acting on the flanges 33, 63 is less likely to vary in the circumferential direction of the flanges 33, 63. As a result, it is possible to improve the sealing performance of the connecting portion of the outlet pipe 31 and the inlet pipe 61.

Also, by reducing the radial dimensions of the first flange 33 and the second flange 63, it is possible to ensure a space around the connecting portion of the outlet pipe 31 and the inlet pipe 61.

Further, the flanges 33, 63 are fastened together by the V-band 81, of which the inner diameter is adjusted by one adjuster bolt. Thus, compared to a case where flanges are fastened together with bolts, the number of bolts required for fastening the flanges 33, 63 is reduced. This reduces the number of steps required for connecting the outlet pipe 31 and the inlet pipe 61.

In the present embodiment, the thickness of each of the flanges 33, 63 increases toward the axis C in the radial direction from the axis C. Since the first flange 33 and the second flange 63 are fastened together by the fastener 80 in a state where the first flange 33 and the second flange 63 are aligned in the extending direction of the axis C, the amount of the elastic deformation of the V-band 81 increases as the flanges 33, 63 are tightened by the V-band 81. That is, by adjusting the inner diameter of the V-band 81 with the adjuster bolt, the fastening force acting on the flanges 33, 63 is easily adjusted.

In the present embodiment, the protrusion 37 of the outlet pipe 31 is fitted into the recess 67 of the inlet pipe 61 as shown in FIG. 3. Thus, positional displacement between the outlet pipe 31 and the inlet pipe 61 is less likely to occur. The recesses 67 and the protrusion 37 are shaped to surround the introduction passage 621 inside the second tubular portion 62 and the discharge passage 321 inside the first tubular portion 32 from outside. Therefore, the effect of suppressing the positional displacement between the introduction passage 621 and the discharge passage 321 can be further enhanced.

When connecting the outlet pipe 31 and the inlet pipe 61 to each other, the position adjustment is completed simply fitting together the protrusion 37 and the recess 67, which are complementary to each other. Therefore, it is easier to perform the position adjustment as compared with a case where position adjustment is performed by fitting several protrusions to several recesses, or a case where position adjustment is performed by aligning bolt insertion holes provided in the flanges. This improves the work efficiency of connecting the outlet pipe 31 and the inlet pipe 61.

In a state in which the outlet pipe 31 and the inlet pipe 61 are connected to each other, the recess 67 and the protrusion 37, which is fitted into the recess 67, serve as a labyrinth structure at the boundary between the outlet pipe 31 and the inlet pipe 61 (an exhaust gas sealing surface). As a result, it is possible to improve the sealing performance of the connecting portion of the outlet pipe 31 and the inlet pipe 61.

In the present embodiment, the forced-induction units 20 and 50 are arranged in the vertical direction in the on-vehicle state. In this state, the distal end face 35 of the outlet pipe 31 and the distal end face 65 of the inlet pipe 61 are both horizontal as shown in FIG. 2. The outlet pipe 31 of the high-pressure-side forced-induction unit 20, which is arranged on the lower side in the vertical direction, receives, at the distal end face 35, the load of the low-pressure-side forced-induction unit 50, which is arranged on the upper side in the vertical direction, via the inlet pipe 61. This makes allows the weight of the low-pressure-side forced-induction unit 50 to be used to press the distal end face 65 against the distal end face 35, which further improves the sealing performance of the connecting portion of the outlet pipe 31 and the inlet pipe 61.

The mass of the low-pressure-side forced-induction unit 50 is larger than the mass of the high-pressure-side forced-induction unit 20. The low-pressure-side forced-induction unit 50, which has a large mass, is arranged on the upper side in the vertical direction of the high-pressure-side forced-induction unit 20, which has a small mass. Thus, the load received by the distal end face 35 of the outlet pipe 31 is large compared with a case in which the high-pressure-side forced-induction unit 20, which has a small mass, is arranged on the upper side in the vertical direction of the low-pressure-side forced-induction unit 50. As a result, it is possible to further improve the sealing performance of the connecting portion of the outlet pipe 31 and the inlet pipe 61.

Furthermore, the weight of the low-pressure-side forced-induction unit 50, which is arranged on the upper side in the vertical direction, is received by the distal end face 35 of the outlet pipe 31 of the high-pressure-side forced-induction unit 20, which is arranged on the lower side in the vertical direction. This restrains the weight of the low-pressure-side forced-induction unit 50 from acting on the fastener 80.

In the present embodiment, the V-band 81 contacts the first flange 33, which directly receives the urging force of the fastener 80. The first flange 33 has the sealing member 84, which closely contacts the second flange 63. This allows the sealing member 84 to be efficiently pressed against the second flange 63. As a result, it is possible to further improve the sealing performance of the connecting portion of the outlet pipe 31 and the inlet pipe 61.

Further, in the present embodiment, the protrusion 37 and the recess 67 are provided in the first tubular portion 32 and the second tubular portion 62. If the protrusion 37 and the recess 67 were provided in the first flange 33 and the second flange 63, the housing groove 39 and the sealing member 84 would be arranged radially outward as compared with the case of the present embodiment. This would be likely to increase the radial dimension of the sealing member as compared with the case of the present embodiment. In this regard, the protrusion 37 and the recess 67 are provided in the first tubular portion 32 and the second tubular portion 62 in this embodiment. This limits an increase in the radial dimension of the sealing member 84.

As shown in FIG. 4, the portion of the first tubular portion 32 on the proximal side of the distal end portion 32A is the thick portion 32B, and the portion of the second tubular portion 62 on the proximal side of the distal end portion 62A is the thick portion 62B. This increases the stiffness of the base of each of the flanges 33, 63, at which stress tends to concentrate, that is, the stiffness of the portion where the first flange 33 bulges from the first tubular portion 32 and the stiffness of the portion where the second flange 63 bulges from the second tubular portion 62.

Since the first flange 33 has the housing groove 39, the first flange 33 has a portion in which the thickness is reduced by the dimension of the housing groove 39. In the present embodiment, both the dimension H1max and the dimension H1mid of the first flange 33 are larger than the dimension H2 of the second flange 63 in the extending direction of the axis C as shown in FIG. 4. This makes it easy to ensure the thickness of the first flange 33 from the inclined surface 34 to the bottom of the housing groove 39. That is, the stiffness of the first flange 33 is restrained from being reduced due to the housing groove 39 provided in the first flange 33.

The above-described embodiment may be modified as follows.

The distal end face 35 of the outlet pipe 31 and the distal end face 65 of the inlet pipe 61 do not necessary need to contact each other as long as the flanges 33 and 63 can be fastened together by the fastener 80 in a state in which the distal end face 35 of the outlet pipe 31 and the distal end face 65 of the inlet pipe 61 are opposed to each other. For example, in a state in which the distal end face 35 of the outlet pipe 31 and the distal end face 65 of the inlet pipe 61 are opposed to each other, the flanges 33, 63 may be fastened together by the fastener 80 with a gasket sandwiched between the distal end face 35 of the outlet pipe 31 and the distal end face 65 of the inlet pipe 61. If the gasket has a through-hole through which the protrusion 37 is allowed to extend, the protrusion 37 can be fitted into the recess 67 even if a gasket is arranged in between. In addition, if a gasket is arranged between the distal end face 35 of the outlet pipe 31 and the distal end face 65 of the inlet pipe 61, the sealing member 84 and the housing groove 39, which houses the sealing member 84, may be omitted.

The thickness of the first flange 33 or the second flange 63 may be constant in the radial direction from the axis C as long as the flanges 33, 63 can be fastened together by the fastener 80.

The dimension H1max and the dimension H1mid of the first flange 33 are larger than the dimension H2 of the second flange 63. However, the magnitude relationship between the dimensions H1max and H1mid of the first flange 33 and the dimension H2 of the second flange 63 is not limited to this.

In the above-described embodiment, the housing groove 39 and the protrusion 37 are adjacent to each other in the radial direction from the axis C, and the wall surface on the inner peripheral side of the housing groove 39 and the surface on the outer peripheral side of the protrusion 37 are continuous with each other. The present invention is not limited to this. For example, the housing groove 39 and the protrusion 37 may be arranged at positions spaced apart from each other in the radial direction. That is, the housing groove 39 and the protrusion 37 may be provided such that the wall surface on the inner peripheral side of the housing groove 39 is located radially outward of the surface on the outer peripheral side of the protrusion 37.

In the above-described embodiment, the wall surface on the inner peripheral side of the housing groove 39 is located in the first tubular portion 32. However, the housing groove 39 may be provided such that the wall surface on the inner peripheral side of the housing groove 39 is located in the first flange 33.

The protrusion 37 may be provided such that the inner circumferential surface 38 of the protrusion 37 is located radially outward of the inner circumferential surface 36 of the outlet pipe 31.

As long as the first flange 33 and the second flange 63 are fastened together by the fastener 80, the present invention is not limited to the forced-induction device in which the high-pressure-side forced-induction unit 20 and the low-pressure-side forced-induction unit 50 are arranged in the vertical direction.

The protrusion 37 does not need to have a shape complementary to the recess 67 as long as the protrusion 37 can be fitted into the recess 67 so as to limit the positional displacement between the outlet pipe 31 and the inlet pipe 61.

The recess 67 does not necessarily need to be annular. The recess 67 may have any shape as long as the positional adjustment can be performed by fitting a recess and protrusion together. For example, it is possible to employ a substantially annular recess in which a part of the annular portion is discontinued, and a protrusion fitted into such a recess. Also, a plurality of recesses may be provided along the circumference of the flange, and a plurality of protrusions may be fitted into the recesses, respectively.

The forced-induction device may be configured such that the low-pressure-side forced-induction unit 50 is arranged on the lower side in the vertical direction of the high-pressure-side forced-induction unit 20.

Figure 5:
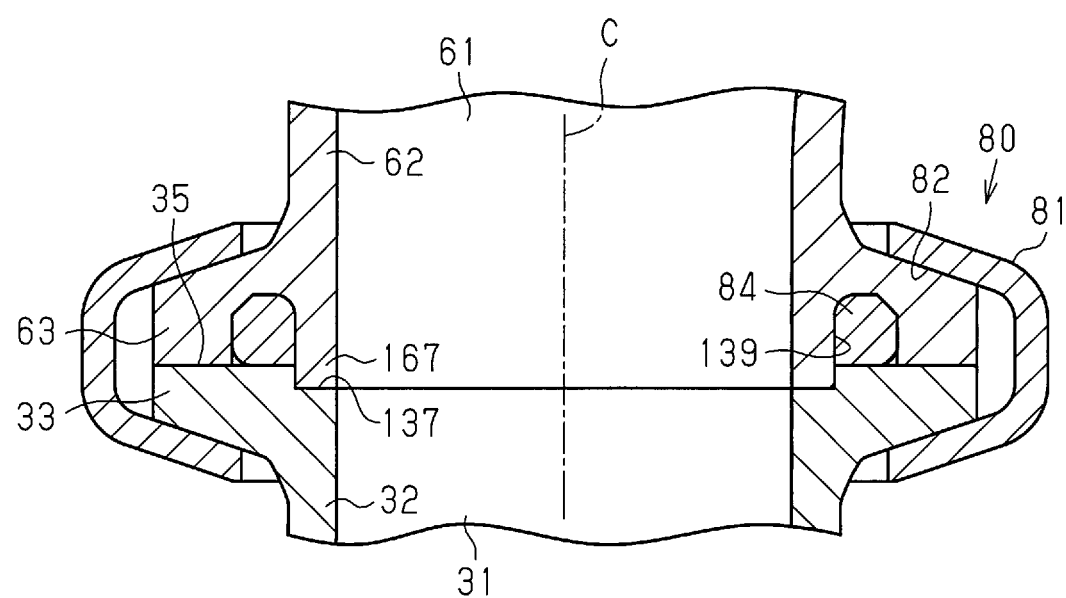
FIG. 5 is a cross-sectional view showing a vehicle forced-induction device according to a modification.

As shown in FIG. 5, a housing groove 139 may be provided in the inlet pipe 61, and the sealing member 84 may be housed in the housing groove 139. In this case, in a state where the outlet pipe 31 and the inlet pipe 61 are connected to each other, the sealing member 84 is in close contact with the distal end face 35 of the outlet pipe 31.

As shown in FIG. 5, a recess 137 may be provided in the outlet pipe 31, and a protrusion 167, which is fitted into the recess 137, may be provided in the inlet pipe 61.

The inlet pipe 61 and the outlet pipe 31 do not necessarily have to have either a recess or a protrusion to be fitted into the recess as long as the flanges 33, 63 can be fastened together by the fastener 80.

The mass of the forced-induction unit located on the lower side in the vertical direction may be larger than the mass of the forced-induction unit located on the upper side in the vertical direction.

Therefore, the present examples and embodiments are to be considered as illustrative and not restrictive and the invention is not to be limited to the details given herein, but may be modified within the scope and equivalence of the appended claims.

The invention claimed is:

1. A vehicle forced-induction device comprising:
a first exhaust turbine type forced-induction unit including
an outlet pipe that discharges exhaust gas from inside the first exhaust turbine type forced-induction unit, the outlet pipe including:
a first tubular portion, through which exhaust gas passes, and
an annular first flange provided at a distal end of the first tubular portion;
a second exhaust turbine type forced-induction unit including
an inlet pipe that introduces exhaust gas into the second exhaust turbine type forced-induction unit, the inlet pipe including:
a second tubular portion, through which exhaust gas passes, and
an annular second flange provided at a distal end of the second tubular portion;
the annular first flange of the outlet pipe and the annular second flange of the inlet pipe being connected to each other;
the first tubular portion of the outlet pipe and the second tubular portion of the inlet pipe communicating with each other; and
a fastener that fastens the annular first flange of the outlet pipe and the annular second flange of the inlet pipe to each other, wherein:
the fastener includes an annular groove having a shape in which a width of the annular groove decreases toward a groove bottom;
the fastener is wound around a circumference of the annular first flange of the outlet pipe and the annular second flange of the inlet pipe to house the annular first and second flanges in the annular groove;
the fastener fastens and urges the annular first and second flanges toward each other;
either one of the outlet pipe and the inlet pipe has a recess in a distal end face; and
the other one of the outlet pipe and the inlet pipe has a protrusion to be fitted into the recess.

2. The vehicle forced-induction device according to claim 1, wherein:
the recess is configured to be annular to surround an exhaust gas transferring passage of the either one of the outlet pipe and the inlet pipe in which the recess is provided; and
the protrusion is configured to be annular to surround the exhaust gas transferring passage of the other one of the outlet pipe and the inlet pipe in which the protrusion is provided.

3. The vehicle forced-induction device according to claim 1, wherein
when the vehicle forced-induction device is mounted on a vehicle, the second exhaust turbine type forced-induction unit is arranged on top of the first exhaust turbine type forced-induction unit in a vertical direction with a distal end face of the outlet pipe and a distal end face of the inlet pipe being opposed to each other in a horizontal direction.

4. The vehicle forced-induction device according to claim 1, wherein:
the outlet pipe has the protrusion;
the inlet pipe has the recess; and
when the vehicle forced-induction device is mounted on a vehicle, the first exhaust turbine type forced-induction unit is arranged below the second exhaust turbine type forced-induction unit in a vertical direction with a distal end face of the outlet pipe and a distal end face of the inlet pipe being opposed to each other in a horizontal direction.

5. The vehicle forced-induction device according to claim 4, wherein:
the first tubular portion has the protrusion;
the second tubular portion has the recess; and
an inner circumferential surface of the protrusion is continuous with an inner circumferential surface of the first tubular portion.

6. The vehicle forced-induction device according to claim 4, wherein a mass of the second exhaust turbine type forced-induction unit is greater than that of the first exhaust turbine type forced-induction unit.

7. A vehicle forced-induction device comprising:
a first exhaust turbine type forced-induction unit including
an outlet pipe that discharges exhaust gas from inside the first exhaust turbine type forced-induction unit, the outlet pipe including:
a first tubular portion, through which exhaust gas passes, and
an annular first flange provided at a distal end of the first tubular portion;
a second exhaust turbine type forced-induction unit including
an inlet pipe that introduces exhaust gas into the second exhaust turbine type forced-induction unit, the inlet pipe including:
a second tubular portion, through which exhaust gas passes, and
an annular second flange provided at a distal end of the second tubular portion;
the annular first flange of the outlet pipe and the annular second flange of the inlet pipe being connected to each other;
the first tubular portion of the outlet pipe and the second tubular portion of the inlet pipe communicating with each other; and
a fastener that fastens the annular first flange of the outlet pipe and the annular second flange of the inlet pipe to each other, wherein:
the fastener includes an annular groove having a shape in which a width of the annular groove decreases toward a groove bottom;
the fastener is wound around a circumference of the annular first flange of the outlet pipe and the annular second flange of the inlet pipe to house the annular first and second flanges in the annular groove;
the fastener fastens and urges the annular first and second flanges toward each other;
either one of the annular first flange and the annular second flange has a housing groove;
the housing groove is configured to be annular so as to surround an exhaust gas transferring passage of the either one of the annular first flange and the annular second flange in which the housing groove is provided;
an annular sealing member is arranged in the housing groove and is in close contact with the other one of the annular first flange and the annular second flange that does not have the housing groove;
a direction in which the annular first flange and the annular second flange are arranged is defined as an axial direction;
a direction in which the annular first flange and the annular second flange are housed in the housing groove is defined as a radial direction; and a dimension in the axial direction of the either one of the annular first and second flanges that has the housing groove is larger than a dimension in the axial direction of the other one of the annular first and second flanges that does not have the housing groove.

8. The vehicle forced-induction device according to claim 7, wherein:
   either one of the outlet pipe and the inlet pipe has a recess in a distal end face; and
   the other one of the outlet pipe and the inlet pipe has a protrusion to be fitted into the recess.

9. The vehicle forced-induction device according to claim 8, wherein:
   the recess is configured to be annular to surround an exhaust gas transferring passage of the either one of the outlet pipe and the inlet pipe in which the recess is provided; and
   the protrusion is configured to be annular to surround the exhaust gas transferring passage of the other one of the outlet pipe and the inlet pipe in which the protrusion is provided.

10. The vehicle forced-induction device according to claim 7, wherein
    when the vehicle forced-induction device is mounted on a vehicle, the second exhaust turbine type forced-induction unit is arranged on top of the first exhaust turbine type forced-induction unit in a vertical direction with a distal end face of the outlet pipe and a distal end face of the inlet pipe being opposed to each other in a horizontal direction.

11. The vehicle forced-induction device according to claim 7, wherein:
    the outlet pipe has a protrusion;
    the inlet pipe has a recess; and
    when the vehicle forced-induction device is mounted on a vehicle, the first exhaust turbine type forced-induction unit is arranged below the second exhaust turbine type forced-induction unit in a vertical direction with a distal end face of the outlet pipe and a distal end face of the inlet pipe being opposed to each other in a horizontal direction.

12. The vehicle forced-induction device according to claim 11, wherein:
    the first tubular portion has the protrusion;
    the second tubular portion has the recess; and
    an inner circumferential surface of the protrusion is continuous with an inner circumferential surface of the first tubular portion.

13. The vehicle forced-induction device according to claim 11, wherein a mass of the second exhaust turbine type forced-induction unit is greater than that of the first exhaust turbine type forced-induction unit.

* * * * *